United States Patent [19]

Schwerin et al.

[11] 4,180,848
[45] Dec. 25, 1979

[54] HYDRAULIC APPARATUS FOR THE AUTOMATIC CORRECTION OF THE INCLINATION OF THE HEADLIGHTS OF A MOTOR VEHICLE

[75] Inventors: Inge Schwerin, Möglingen; Ulrich Zillgitt, Stuttgart; Steffen Schneider, Möglingen; Hellmut Kegel, Gerlingen; Hans-Rudolf Bodensieck, Gerlingen; Helmut Zauft, Gerlingen; Reinhold Poglitsch, Reutlingen; Kurt Grabow, Feucht, all of Fed. Rep. of Germany

[73] Assignee: Robert Bosch GmbH, Stuttgart, Fed. Rep. of Germany

[21] Appl. No.: 842,997

[22] Filed: Oct. 17, 1977

[30] Foreign Application Priority Data

Nov. 27, 1976 [DE] Fed. Rep. of Germany ....... 2654015

[51] Int. Cl.² ............................................. B60Q 1/10
[52] U.S. Cl. ................................................ 362/71
[58] Field of Search ................................. 362/66, 71

[56] References Cited

U.S. PATENT DOCUMENTS

| 3,370,162 | 2/1968 | Henry-Biabaud | 362/71 |
| 3,402,287 | 9/1968 | Hindman | 362/71 |
| 3,453,424 | 7/1969 | Cibie | 362/71 |
| 3,614,416 | 10/1971 | Fleury | 362/71 |
| 3,617,731 | 11/1971 | Fleury | 362/71 |
| 3,643,082 | 2/1972 | Fleury | 362/71 |
| 3,828,179 | 8/1974 | Straub | 362/71 |
| 3,859,516 | 1/1975 | Tuzson | 362/71 |

FOREIGN PATENT DOCUMENTS

| 2205174 | 8/1970 | Fed. Rep. of Germany | 362/71 |
| 2503834 | 7/1975 | Fed. Rep. of Germany | 362/71 |
| 1072616 | 6/1967 | United Kingdom | 362/71 |

*Primary Examiner*—Benjamin R. Padgett
*Assistant Examiner*—T. S. Gron
*Attorney, Agent, or Firm*—Edwin E. Greigg

[57] ABSTRACT

What follows is the description of an improved hydraulic apparatus for the automatic adjustment of the inclination of the headlights of a motor vehicle, the adjustment being a dependent function of the axle load. The apparatus has a level sensor at each axle and each level sensor contains one metering piston and two positioning pistons. The rear axle level sensor is connected via two separate hydraulic lines to the front axle sensor, and the front axle sensor is in turn connected via two separate hydraulic lines to the positioning elements of the headlight housings. The internal construction of the two level sensors is substantially identical and is chosen such that the system is also suitable for manual adjustment.

8 Claims, 2 Drawing Figures

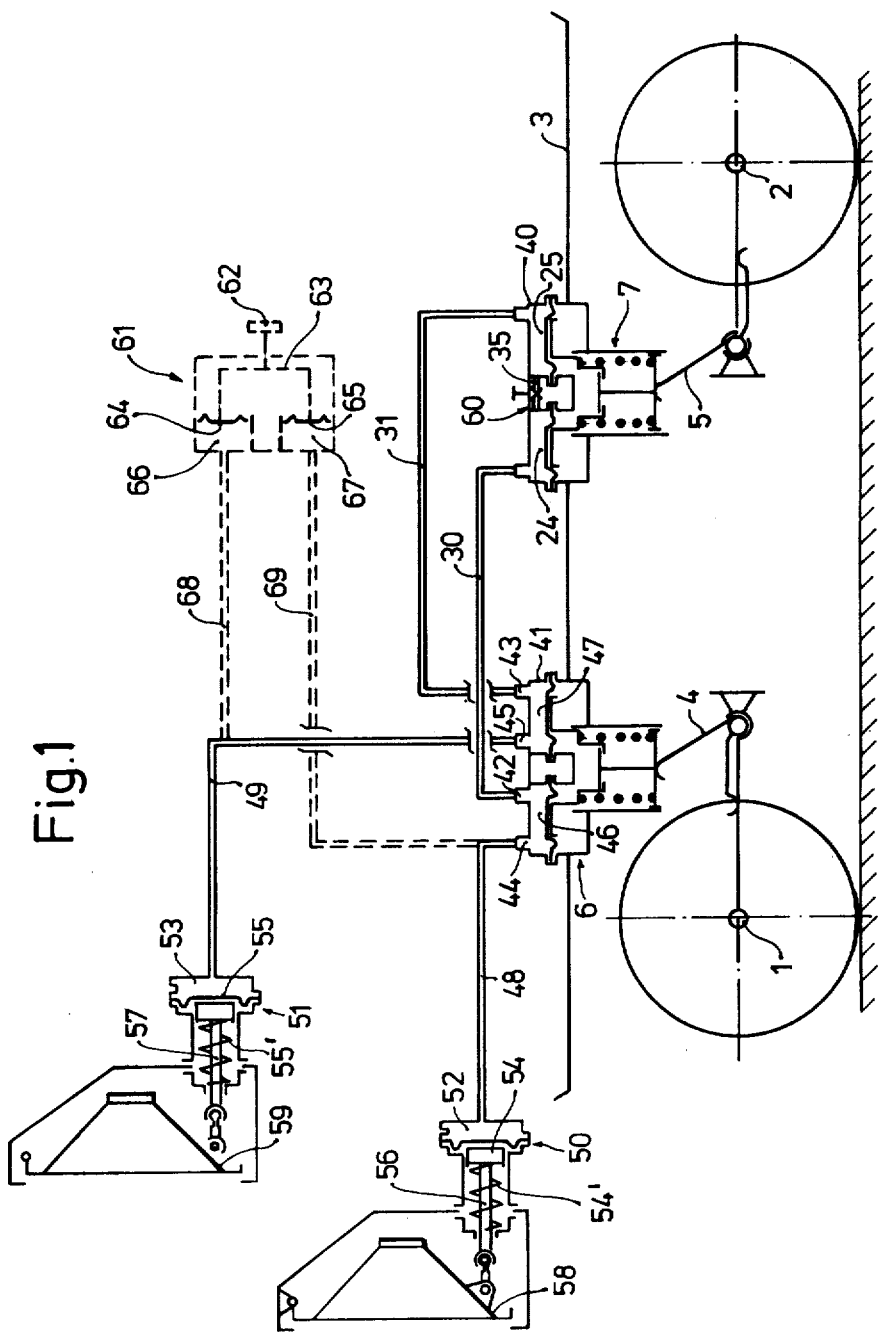

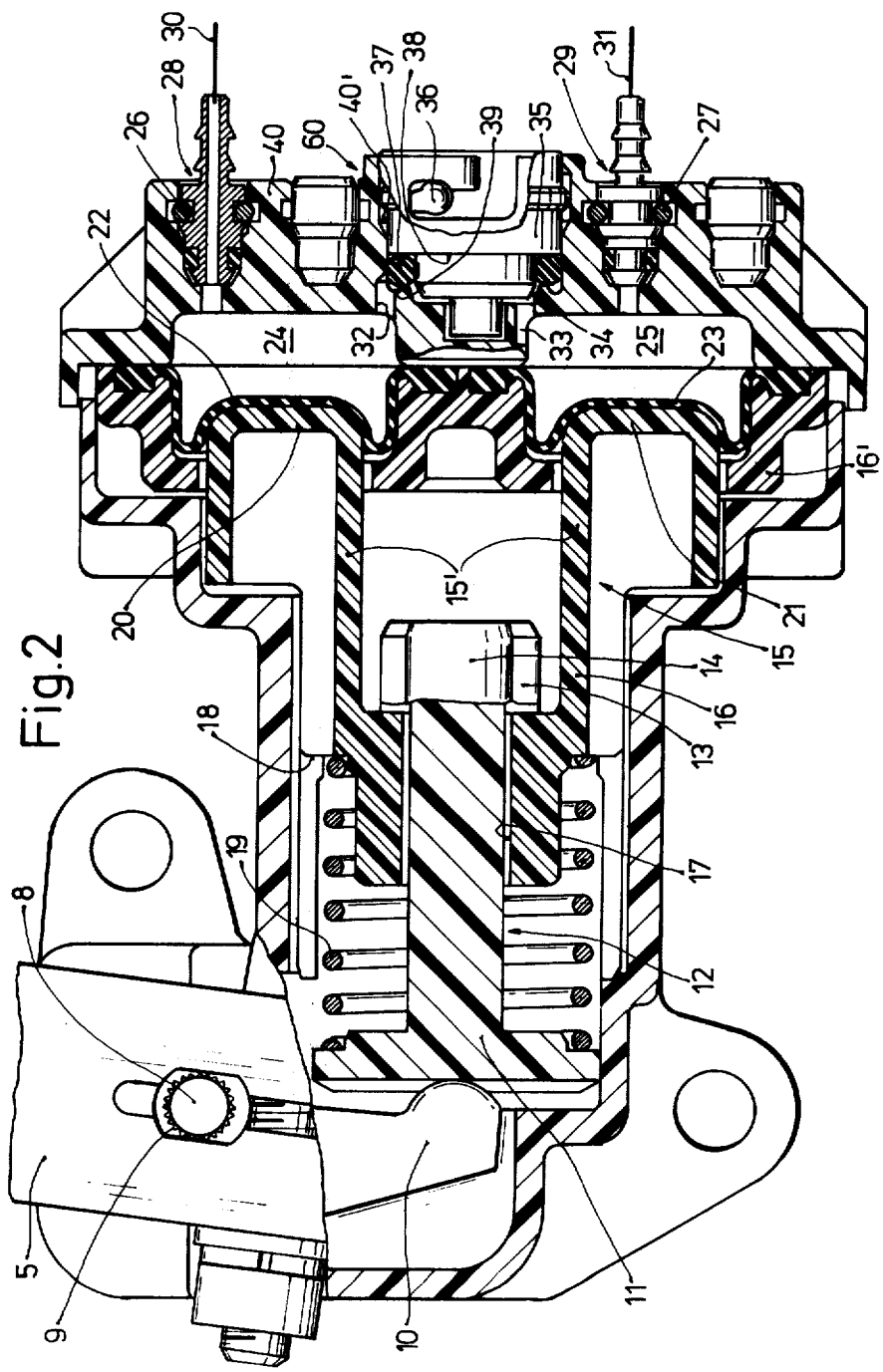

HYDRAULIC APPARATUS FOR THE AUTOMATIC CORRECTION OF THE INCLINATION OF THE HEADLIGHTS OF A MOTOR VEHICLE

BACKGROUND OF THE INVENTION

This invention generally relates to an hydraulic apparatus having means for automatically adjusting the positions of the headlights of a motor vehicle as a dependent function of the load on the axles of the motor vehicle and more particularly an apparatus in which the movement of the front and rear axles relative to the sprung motor vehicle body are oppositely sensed by means of a metering piston of a level sensor that is installed in proximity to each of the axles and the reactions of which are transmitted by means of positioning elements to the headlight housings.

Such an apparatus is generally known by the disclosure in DT-AS No. 2,014,280. In this apparatus, the level sensors and the positioning elements lie within a continuous conduit and the positioning elements are arranged in series. In such an apparatus it is not possible to incorporate thereinto additional elements that will permit manual operation of the headlight adjusting members.

On the other hand and by virtue of DT-OS No. 2,503,834, an apparatus with a hydraulic and manually effected adjustment is known in which a mechanically actuatable sensor is connected by way of two separate hydraulic lines that extend to the positioning elements of the headlight housings. However, such an apparatus is not adapted for automatic and load dependent operation.

There is also known by virtue of DT-OS No. 1,455,748 (see FIG. 2), an automatic and load dependent hydraulic apparatus in which, however, the rear axle level sensor requires a special converter.

OBJECT AND SUMMARY OF THE INVENTION

Accordingly, the primary object of this invention is to provide an apparatus for hydraulically adjusting the headlights of a motor vehicle through level sensors that are automatically and load dependently actuated and into which is further incorporated a mechanically actuatable manual adjustment means.

Another object of this invention is to provide an apparatus of the aforesaid type in which the level sensors are constructed identically thus making the apparatus considerably cheaper to manufacture.

Still another object of the invention is that this concept provides the advantage of providing separate circuits for the left headlight as well as for the right headlight. Thus in this way positioning of the headlights is thereby simplified, and a leak in a conduit is made less problematic thereby.

A further object of this invention is to provide an assembly in which the line connections at the sensors and at the positioning elements are embodied as removable push-pull couplings that are suitably sealed against loss of hydraulic fluid.

Yet another object of this invention is to provide a valve provided with a special sealing means that is adapted to guard the interconnection of the two hydraulic circuits at one sensor.

The invention will be better understood and further objects and advantages will become apparent from the ensuing detailed specification of preferred but merely exemplary embodiments taken in conjunction with the drawings.

BRIEF DESCRIPTION OF THE DRAWING

FIG. 1 shows in a highly schematical view a hydraulic system, according to the invention, for automatically adjusting the position of the headlights of an automobile, and FIG. 2 is a cross sectional view of a level sensor.

DESCRIPTION OF THE PREFERRED EMBODIMENT

Turning now to the drawings, a motor vehicle front axle 1 as well as the rear axle 2 thereof are supported by spring means, not shown, relative to a vehicle body 3. As shown, levers 4 and 5 are arranged to cooperate with a level sensor 6 located in proximity to the front axle 1 and upon a level sensor 7 that is supported adjacent to the rear axle 2. Thus, the motions of the axles 1 and 2 are transmitted to its respective sensor means.

The two level sensors 6 and 7 are essentially identical in their construction and dimensions. In FIG. 2 there is shown an enlarged cross-sectional view of the rear axle sensor 7. It is to be noted that the lever 5 is attached on a shaft 8 with the aid of a toothed rim 9 and the end portion of the lever 10 touches the foot 11 of an elongated shank that terminates in a plunger 12. The plunger 12 has a head 13 that is provided with a keying surface 14. A metering piston 15 includes a hollow axially extending sleeve portion 16 that is provided with a narrow bore 17 that is complemental to the shank that supports the head 13 with its keying surface 14. A spring 19 is interposed between the foot 11 and an outer shoulder portion 18 of the metering piston 15 so that after inserting the head through the bore 17 and rotating it 90 degrees the assembly can be held together by the spring.

The metering piston 15 includes a fork piece 15' which provide two integral positioning pistons 20 and 21, respectively, these pistons being arranged to act on the diaphragms 22 and 23. The pistons 20 and 21 are arranged to extend through dual oppositely spaced apertures in member 16' and rest against portions of diaphragms 22 and 23, as shown. The pistons 20 and 21 together with diaphragms 22 and 23, as shown in FIG. 2, thus form two working chambers 24 and 25. An apertured cover 40 is provided with dual depressions that coincide with the bulged area created by the pistons 20 and 21 and the corresponding diaphragms 22 and 23. The depressions in the cover 40 extend to apertures into each of which are inserted pipe couplings or nipples 28 and 29 preferably in the form of latchable push couplings that are retained in said apertures by means of seal-type O-rings 26 and 27, respectively. The working chambers 24 and 25 each communicate with parallel bores 32 and 33 provided in the cover 40 so as to connect the working chambers 24 and 25 to a chamber 34 that is located in a bore 40' provided in the cover and closed toward the outside by means of a plug 35 which has a bayonet lock 36. An O-ring 37 that rests against a shoulder 38 of the plug 35 serves to seal the chamber 34 toward the atmosphere. The O-ring 37 is pressed by means of the locking plug 35 against an annular rim 39 situated in the bore 40' of cover 40 and disposed between the two axially parallel bores 32 and 33. In this manner the O-ring 37 and the annular rim 39 thus form a valve 60. The plug 35 needs only to be lifted slightly to disconnect the bayonet lock function to interconnect the two working chambers 24 and 25. Accordingly the O-ring 37 will then lift off the annular rim 39. However, the O-ring 37 still continues to remain effective as a seal toward the atmosphere.

The aforesaid elements 32 to 39 as well as 40' and 60 are present only in the rear axle level sensor 7. However, although the front axle level sensor 6 does also include a cover element 41, the plug 35 and the valve 60 are not included in this sensor. On the other hand, four push couplings or nipples 42, 43, 44, and 45 are disposed in apertures in the cover 41, of which two (42 and 43) are provided for the lines 30 and 31 that extend from the rear axle level sensor 7 and are attached to working chambers 46 and 47. Hydraulic lines 48 and 49 also extend from the same working chambers 46 and 47 and lead separately via the push couplings or nipples 44 and 45 to the positioning elements 50 and 51 located adjacent to the headlights as will be explained later herein.

The two positioning elements 50 and 51 comprise an assembly of identical elements (FIG. 1). They each have working chambers 52, 53 that are bounded by diaphragm pistons 54, 55 which are acted upon by a spring means 54', 55'. A piston rod 56, 57 of each piston 54, 55 is linked to a housing 58, 59 of a headlight that is swivably supported on the vehicle.

A manual positioning device 61 is shown by means of dashed lines in FIG. 1, and includes a threaded element 62 or other suitable positioning means which acts via a yoke 62 that in turn is arranged to cooperate with a pair of pistons 64 and 65. The pistons 64 and 65 comprise the working chambers 66 and 67 that are connected via the lines 68 and 69 to the lines 48 and 49. The manual positioning assembly 61 except for the actuator 62 has the same dimensions, type of couplings, or nipples and construction as do the level sensors 6 and 7. Accordingly, the manual positioning assembly 61 can be substituted for the level sensors 6 and 7, when the headlights are to be actuated manually. Conversely, the conversion of a manual to an automatic and load dependent actuation is also possible without difficulty due to the identical dimensions of the hydraulic chambers 6, 7, and 61.

OPERATION

The hydraulic system shown in FIG. 1 is a static system in which a static pressure prevails that is dependent on its magnitude upon the pre-tensioning of the springs 54' and 55' in the positioning elements 50 and 51.

During a uniformly increasing or uniformly decreasing load upon the axles of the motor vehicle, the system remains at rest due to the counteracting deflections of the levers 4 and 5, except that the level sensors 6 and 7 exchange fluid via the lines 30 and 31. Consequently the total fluid capacity of the four working chambers 24, 25, 46, and 47 remains unchanged.

However, when either of the motor vehicle axles 1 or 2 are loaded more than the other, then the total fluid capacity of the four working chambers 24, 25, 46, and 47 changes and the pistons 54 and 55 of the positioning elements re-position the housings 58 and 59 of the headlights equally and in the same direction via the separate lines 48 and 49 within separate fluid circuits. Also, it is to be understood that like re-positioning of the housings 58 and 59 is possible with the aid of the manual positioning device 61, when the apparatus is to be manually actuated.

The apparatus is filled at the level sensor 7 by means of the valve 60 (better shown in detail in FIG. 2), and the fluid can transfer from one circuit to the other when the valve 60 is lifted. In addition, a relief valve is provided at an elevated location.

The described apparatus is substantially the same for automatic positioning and for manual positioning, so that a simple changeover is made possible. In addition, simple and identical positioning elements and pistons are used at the hydraulic chambers 6, 7, and 61. Each headlight has its own separate hydraulic circuit.

Furthermore, the positioning elements 50 and 51 at the headlights are also identical, and the housings of the hydraulic chambers 6, 7, and 61 are likewise substantially identical. Roll diaphragms, fabric diaphragms and foils can also be used as diaphragms for the pistons 20 and 21 as well as 54 and 55 and also for 64 and 65. The interconnection of the housing components of the level sensors and of the positioning elements, as well as the actuation excursion of the valve 60, are produced by means of bayonet couplings which are simply and rapidly loosened and joined.

What is claimed is:

1. In a hydraulic apparatus having means for automatically adjusting the positions of the headlights of a motor vehicle as a dependent function of the load on the axles, in which the movement of the front and rear axles relative to the sprung motor vehicle body are oppositely sensed by means of a metering piston of a level sensor installed in proximity to each vehicle axle and are transmitted by means of positioning elements to the headlight housings, the further improvement wherein each metering piston in said level sensors includes a fork piece forming a pair of parallel and adjacently disposed positioning pistons and a pair of working chambers each adjacent one of said positioning pistons, two separate hydraulic lines each arranged to connect one of said pair of working chambers in said rear axle level sensor to one of said pair of working chambers in said front axle level sensor and two separate hydraulic lines each arranged to connect one of said pair of working chambers in said front axle level sensor to said means for adjusting the positions of a respective one of said headlights.

2. Apparatus according to claim 1, in which said rear axle level sensor metering piston further includes a pre-tensioning spring disposed between an actuating lever and said level sensor metering piston, and further wherein a plunger is rotatable relative to a sleeve on said metering piston to thereby latch said plunger to said metering piston.

3. Apparatus according to claim 1, in which said front and rear axle level sensors are interiorly identical.

4. Apparatus according to claim 1, in which said rear axle level sensor includes two couplings each for one of said two separate hydraulic lines in said rear axle level sensor and means including a valve for providing communication between said two separate working chambers in said rear axle level sensor.

5. Apparatus according to claim 4, in which said valve includes a closure body having an O-ring which seals to atmosphere.

6. Apparatus according to claim 1, in which said front axle level sensor is provided with four couplings for connecting said working chambers in said front axle level sensor with said separate hydraulic lines.

7. Apparatus according to claim 6 wherein each of said level sensors includes a housing and wherein said rear axle level sensor includes two couplings each for one of said two separate hydraulic lines in said rear axle level sensor and wherein said couplings are mounted on said housings and are in the form of latchable push couplings.

8. Apparatus according to claim 1 including a manually operable sensor and means for connecting said manually operable sensor to said means for automatically adjusting the positions of said headlights.

* * * * *